United States Patent
Andrae et al.

(10) Patent No.: US 12,317,161 B2
(45) Date of Patent: May 27, 2025

(54) METHOD FOR SENDING A VEHICLE-TO-X MESSAGE BY A SENDER, METHOD FOR PROCESSING A VEHICLE-TO-X-MESSAGE, AND A VEHICLE-TO-X-COMMUNICATIONS MODULE

(71) Applicant: Continental Automotive Technologies GmbH, Hannover (DE)

(72) Inventors: Andreas Andrae, Frankfurt am Main (DE); Marc Menzel, Weimar (DE); Richard Scherping, Liederbach am Taunus (DE)

(73) Assignee: Continental Automotive Technologies GmbH, Hannover (DE)

( * ) Notice: Subject to any disclaimer, the term of this patent is extended or adjusted under 35 U.S.C. 154(b) by 37 days.

(21) Appl. No.: 18/266,177

(22) PCT Filed: Nov. 29, 2021

(86) PCT No.: PCT/EP2021/083370
§ 371 (c)(1),
(2) Date: Jun. 8, 2023

(87) PCT Pub. No.: WO2022/122450
PCT Pub. Date: Jun. 16, 2022

(65) Prior Publication Data
US 2024/0098465 A1    Mar. 21, 2024

(30) Foreign Application Priority Data
Dec. 10, 2020    (DE) .................... 10 2020 215 634.4

(51) Int. Cl.
*H04W 4/40* (2018.01)

(52) U.S. Cl.
CPC ...................................... *H04W 4/40* (2018.02)

(58) Field of Classification Search
CPC .......... H04W 4/40; H04W 4/20; H04W 4/38; H04W 4/46; G08G 1/163; G08G 1/167
(Continued)

(56) References Cited

U.S. PATENT DOCUMENTS 9,566,966 B2    2/2017 Erdem et al.
11,388,565 B2 *   7/2022 Hwang ................. H04W 28/02
(Continued)

FOREIGN PATENT DOCUMENTS

| DE | 102017205230 A1 | 10/2018 | |
|---|---|---|---|
| EP | 3462754 A1 * | 4/2019 | ............. H04L 67/12 |
| WO | 2020117073 A1 | 6/2020 | |

OTHER PUBLICATIONS

International Search Report and Written Opinion dated Feb. 25, 2022 from corresponding International patent application No. PCT/EP2021/083370.

(Continued)

*Primary Examiner* — Eric Blount (57) ABSTRACT

Disclosed is a method for sending a vehicle-to-x-message including an information part and a safety part, wherein the safety part comprises information that can be used to evaluate quality and reliability of the information contained in the information part regarding its usability and qualification for safety-related driving functions and tasks. Also disclosed is a corresponding method for receiving and a corresponding vehicle-to-x-communications module.

20 Claims, 1 Drawing Sheet

Use Case: Evasive Lane Change

Vehicle (#1) approaching vehicle (#2) in neighboring lane broadcasting timestamp, location, speed, acceleration, and heading vectors (incl. sensor-specific validity values)

Vehicle (#2) relies on V2X data from vehicle (#1) and truck (#3) for assessing data quality and usability (according to received validity values) and for planning an evasive lane change maneuver Truck (#3): slow or broken down vehicle, broadcasting timestamp, location, speed, acceleration, and heading vectors heading (incl. sensor-specific validity values)

(58) Field of Classification Search
USPC .................................................. 340/425.5
See application file for complete search history.

(56) References Cited

U.S. PATENT DOCUMENTS

| | | | |
|---|---|---|---|
| 11,968,603 B2* | 4/2024 | Hwang | ............... G08G 1/0133 |
| 2009/0254244 A1 | 10/2009 | Xu et al. | |
| 2018/0012279 A1 | 1/2018 | Ricci | |
| 2018/0076958 A1 | 3/2018 | Narimoto et al. | |
| 2018/0203130 A1* | 7/2018 | Neubecker | ............. G01S 19/46 |
| 2019/0232972 A1* | 8/2019 | Lin | ........................ G01C 25/00 |
| 2020/0258320 A1* | 8/2020 | Lu | ............................ H04W 4/40 |
| 2020/0365029 A1* | 11/2020 | Kourous-Harrigan | ...................... G08G 1/167 |

OTHER PUBLICATIONS

"Use Case Description: Co-operative Lane Merge", 5GAA Working Group 1 meeting; 9th F2F Meeting, Seoul, South Korea Jan. 28-30, 2019, T-190013, (revision of T-180136, T-180246), Ford, Huawei.
"Exponential Smoothing", https://en.wikipedia.org/wiki/Exponential_smoothing, 2021, Wikipedia.
"Intersectional Movement Assist", 5GAA Working Group 1, T-180229 Conference call #10, Aug. 29, 2017, Ford, BMW, Audi, Denso, Huawei, Nokia, Intel.
Juliane Hoebel et al. "Towards a Sensor Failure-Dependent Performance Adaptation Using the Validity Concept", Springer International Publishing AG 2017 S. Tonetta et al. (Eds.): SAFECOMP 2017, LNCS 10488, pp. 270-286, 2017. DOI: 10.1007/978-3-319-66266-4 18.
"Technical Report on CPM Object Quality CAR 2 CAR Communication Consortium", Communication Consortium, F0014_CPM_ObjectQuality_Deliverable.docx Mar. 15, 2021, 2021.
Andreas Andrae "Safety Qualifier for V2X", 2017 11th European Conference on Antennas and Propagation (EUCAP), 2018, 5GAA Automotive Association.
Tino Brade et al. "Validity-based failure algebra for distributed sensor systems", 2013 IEEE 32nd International Symposium on Reliable Distributed Systems IEEE Sep. 30, 2013 (Sep. 30, 2013), pp. 143-152.
Antonio Casimiro et al. "The KARYON Project: Predictable and Safe Coordination in Cooperative Vehicular Systems", 978-1-4799-0181-4/13/$31.00, 2013, IEEE.
Marc Menzel et al. "Enable functional safety with V2X communication", white paper submitted to C2C Consortium on Mar. 30, 2019.
Tino Brade et al. "Sensor- and Environment Dependent Performance Adaptation for Maintaining Safety Requirements", A. Bondavalli et al. (Eds.): SAFECOMP 2014 Workshops, LNCS 8696, pp. 46-54, 2014. Springer International Publishing Switzerland 2014.

* cited by examiner

METHOD FOR SENDING A VEHICLE-TO-X MESSAGE BY A SENDER, METHOD FOR PROCESSING A VEHICLE-TO-X-MESSAGE, AND A VEHICLE-TO-X-COMMUNICATIONS MODULE

The invention relates to a method for sending a vehicle-to-x-message by a sender, a method for processing a vehicle-to-x-message, and to a related vehicle-to-x-communications module.

Vehicle-to-x-communication is currently in the state of standardization, development, and implementation. It generally provides for exchange of information between vehicles and infrastructure units.

In current implementations of vehicle-to-x-communication, it is usual to transmit information. However, it was found that reliability of this information when received by a receiver cannot be determined sufficiently in some cases.

It is thus an objective of the invention to provide for methods that are alternative or improved with respect to the prior art, for example relating to determination of quality and/or reliability of safety-related information. It is a further objective of the invention to provide for a corresponding vehicle-to-x-communications module. These objectives are achieved by the subject matter of the independent claims. Preferred embodiments can be derived from the respective dependent claims. The content of the claims is made a content of the description by explicit reference.

The invention relates to a method for sending a vehicle-to-x-message by a sender, wherein the vehicle-to-x-message at least comprises an information part and a safety part. The information part comprises information characterizing the sender and/or data measured and/or calculated by the sender. The safety part comprises safety information relating to one or more entities of the sender measuring, calculating, transmitting and/or processing the information.

With such a method, a vehicle-to-x-message may not only comprise information that is directly relevant for a receiving entity, but may also comprise information that allows the receiving entity to determine if the received information is qualified and sufficiently reliable for being used by a safety-related vehicle driving function.

It should be noted that one has to differentiate between security and safety. Security is the resistance against fraudulent attacks or manipulation of data. Safety is the resistance against technical failures that have not been initiated deliberately, for example against false data processing or transmission errors. In the context of this application safety is relevant.

A sender may, for example, be a vehicle. It may also be an infrastructure unit, an infrastructure sensor, a roadside unit (RSU), e.g. an intelligent intersection, or any other participant in vehicle-to-x-communication.

According to an implementation, the safety part may comprise at least one safety level characterizing an entity and/or a provided information grade. This safety level characterized the providing entity and reflects the provided information grade, so that the receiver can use this information in deciding if the quality of the received information is sufficient.

According to an implementation, the safety part may comprise at least one failure rate of a bus system transmitting the information before sending. This gives information about a bus system that is typically used in a vehicle to transport data from a sensor or another entity to a vehicle-to-x-communication module.

According to an implementation, the safety part may comprise at least one indication of a software development process, hardware development process, data generation process, safety engineering standard or processing grade used for developing software of an entity. This can also be used by the receiver to determine quality of the received information.

According to an implementation, the safety part may comprise a respective predicted validity time for one, some or all information. This gives the receiver an information about a time period in which the sender deems the information as not undergoing changes or at least not undergoing substantial changes. For example, the sender can predict how long he will presumably hold a current speed or course.

According to an implementation, the validity time may, at least inter alia, be calculated based on previous measurements or calculations and/or previous validity values. This may be performed in the sender. Also, other means for calculation may be used.

According to an implementation, the safety part may comprise at least one indication of an error model of an entity. This can give an agreed and/or standardized feedback about a quality of a data generating entity that can be used directly by a receiver to evaluate data quality and related safety requirements. The indication may be a number or other short information. The error model may comprise complex implementation details that can be agreed and/or standardized over all participants in vehicle-to-x-communication.

The error model may, for example, be a hardware failure model of the entity or an error model of the data generated by the entity. This can also give direct indication about the reliability and safety.

According to an implementation, the safety part may comprise at least one confidence, variance, details of an underlying error model of an entity, and/or an absolute or relative validity time of data generated by an entity.

According to an implementation, the safety part may comprise meta-data and/or a multidimensional failure vector. This can give very specific information about the sender and/or its entities. The meta data and/or the multidimensional failure vector may especially further characterize the data providing entity.

Especially, the safety information may be continuously updated. This allows for a high timeliness of the relevant information.

According to respective implementations, the information part comprises one or more of sensor data, speed sensor data, heading data, yaw rate data, acceleration data, curvature data, path history data, radar data, lidar data, steering angle data, position data, camera data, map data, object data, maneuver-related data, intended or planned driving trajectory and/or course data. Such information provides relevant information for traffic safety and maneuver coordination. However, also other information can be used.

According to an implementation, also vehicle-to-x-messages without a safety part are sent, and vehicle-to-x-messages including a safety part are only or at least sent in response to one or more pre-defined events and/or automated driving policy or function and/or detected entities (e.g., vehicles, scooters, pedestrians) near the sender and/or in response to a received request.

This allows an implementation in which information for determining safety is only sent when necessary, so that bandwidth is saved in other cases. There may be specific rules when a safety part is sent, for example only for specific message types or in specific situations. However, it is also possible to send the safety part only in response to a received request.

A detection may be made, for example, by a camera, an environment sensor or by wireless communication. Not only on-board sensors may be used. A pre-defined event may also be the intention to initiate and perform maneuver coordination. The automated driving policy/function may further specify when to start sending which data.

According to an implementation, the information part may comprise respective tolerance bands for one, some or all information. For example, a tolerance band can be given around a value like a velocity or a distance. A receiver can determine the probability that the value is in fact inside the tolerance band using the information contained in the safety part. Such a tolerance band may also be comprised in the safety part.

The invention further relates to a method for processing a vehicle-to-x-message, the process comprising the following steps:

receiving a vehicle-to-x-message comprising an information part and a safety part, identifying a task and/or function in which the vehicle-to-x-message is relevant, assessing, based on the safety part and/or the information, whether an information quality or data quality of the vehicle-to-x-message is sufficient for the task, and performing the task based at least on the vehicle-to-x-message only if the information quality and/or data quality is sufficient.

This allows for increased safety at the side of a receiver of a vehicle-to-x-message. For example, a safety can be determined before information received using vehicle-to-x-communication is used in a critical maneuver like lane change.

The method may further comprise the following step:

sending a request for further safety data if the data quality and/or safety cannot be determined sufficiently based on the safety data and/or the information.

The safety data in this case, i.e., for determining if a request for further safety data has to be sent, is especially the safety data present at the time of deciding if such a request has to be sent. Using this implementation, further safety data can be specifically requested when needed to prepare a critical maneuver, for example. With such an implementation, data bandwidth can be saved because the safety part can be sent in less times.

For example, the task may be a lane change or any other driving maneuver. Such tasks typically need a specifically reliable coordination with other vehicles, as collisions may occur otherwise. However, also other tasks may be applied.

The invention relates further to a vehicle-to-x-communications module being configured to perform a method as described herein. With regard to the method, all implementations and variations as described herein can be applied.

The invention relates further to a non-transitory computer readable medium comprising program code that makes a processor to perform a method as described herein. With regard to the method, all implementations and variations as described herein can be applied.

Generally stated, the introduction of V2X systems raises questions regarding the usage of V2X data for automated driving functions that are subject to functional safety requirements. As of today, there is no concept that can ensure that V2X data transmitted and received by connected and automated vehicles meet the respective safety requirements for connected, automated, and potentially cooperative driving functions. From a safety design standpoint, data, such as sensor information, that is exchanged via V2X communications is typically classified as "Quality Management (QM) only", since its trustworthiness, correctness, accuracy, and reliability cannot be validated.

There is currently no technical or legal mechanism in place to require even the correct implementation of the minimal available accuracy information via confidence values.

For establishing trust among V2X stakeholders in using V2X data for automating vehicle behavior and coordinating cooperative driving maneuvers, new safety-related data fields and methods are disclosed herein.

For considering, validating, and finally relying on external data (provided via V2X communications) in the driving function design process, in particular the safety concept, as well as in the operational phase, new mechanisms need to be introduced on the data provider as well as on the data receiver side.

Thus, additional safety-related data fields incl. sensor meta-data may be exchanged as part of V2X messages, such as ETSI CAM, DENM.

Further, these new data fields are used by each V2X-enabled vehicle for validating the received data and evaluating its usability for safety-related driving functions.

The proposed method is not limited to a particular V2X use case but should be considered as a general enabler supporting the fulfillment of safety requirements of automated driving functions as well as for facilitating trustworthy data exchange. Further, the method covers both sides: transmitter and receiver.

Typical basic safety requirements are that the transmitted/received data shall be correct and reliable. Thus, the transmitting and receiving vehicles need to manage and process the to be exchanged vehicle sensor data and its usage at the receiver side for safety-related driving functions in the following manner:

Vehicle sensor data is provided by in-vehicle components, e.g., as a measurement of a physical quantity (e.g., speed, heading, yaw rate) or as a processing result of an in-vehicle sub-system (e.g., positioning, camera, radar, LiDAR system). As the grade of the in-vehicle components and sub-system is known at vehicle level, the retrieved data can be assessed and rated, e.g., using the respective component and sub-system specifications, validation test results, etc. Further, data-specific error models can be established and categorized.

In a solution disclosed herein, the transmitter adds specific meta-data to the V2X message content, when transmitting safety-related V2X messages. In particular for supporting automated and cooperative driving functions the transmitting vehicle provides sensor- and data-specific meta-data (e.g., confidence, variance, details of the underlying error model, absolute/relative validity time) in addition to the standard vehicle sensor data fields to other V2X-enabled vehicles. Sensor-specific meta-data, such as confidence, depends on the current sensor state (e.g., start-up, operational, failure) and may change over time.

An agreed and/or standardized catalogue of agreed error models may be used to optimize data volume needed for V2X data exchange and usefulness for different receivers, where each receiver and the related assistance or driving function must meet different requirements regarding the data availability and observability.

Regarding standardization of data models, there are ongoing discussions on standardizing positioning and timing related data representation in ETSI EN 302 890-2 V2.1.1

(2020-10) "Position and Time management (PoTi)", from which further standardization activities covering other sensor types might be triggered.

In a proposed solution, the sensor data and meta-data validity are determined by the transmitting vehicle or by the sender. The data type and the meta-data's level of detail are determined by the transmitting vehicle and differ with respect to the use case and driving situation.

The receiving vehicles will use the provided sensor data and meta-data to check whether this data is qualified to be used by an automated and/or cooperative driving function.

For the validation of received V2X data using the provided meta-data, one can make use of the "Validity-Based Failure Algebra" approach (validity-based quality measure of sensor observations applicable at design-time as well as at run-time).

Further, the transmitting vehicle can not only provide information on instantaneous sensor data validity, but can continuously monitor and aggregate in-vehicle sensor data for predicting future sensor validity and the related validity time, i.e., a future validity value plus a time period for how long the predicted validity value is estimated to be valid is provided by the transmitting vehicle. In particular, sensor-specific validity values plus extended senor meta data including the various error contributions (depending on the underlying error models) are determined and transmitted. The transmission of detailed and extended sensor meta data can be pre-configured or requested via V2X messaging.

Further, the sensor quality-related meta-data can be used to extend a solution for cooperative driving, where cooperation requests are only accepted, if additional safety meta-data, e.g., sensor validity values, can be provided by the requesting vehicle.

The proposed concept enables connected and automated vehicles to assess whether information provided from external sources (e.g., backend systems, roadside units, other V2X enabled entities) can be used for safety-related vehicle functions, such as advanced driver assistance systems (e.g., automated emergency braking) and automated driving functions.

There are ongoing discussions on standardizing positioning and timing related data representation in ETSI EN 302 890-2 V2.1.1 (2020-10) "Position and Time management (PoTi)", from which further standardization activities covering other sensor types might be triggered.

The described implementation may especially be used in automated driving, connected and cooperative intelligent transportation systems, tele-operations, remote control, and cooperation of vehicles, machinery, and/or robots.

As a prerequisite, each vehicle must collect its in-vehicle sensor data (time, location (longitude, latitude, altitude), (wheel) speed, acceleration, yaw rate, heading, steering angle, etc.).

Using defined failure, detector, and filter models, instantaneous sensor-specific validity values [BZK13] are determined. During operation, each vehicle can continuously monitor and update its sensor-specific validity values.

Further each vehicle may monitor and aggregate its in-vehicle sensor data (time, location (longitude, latitude, altitude), (wheel) speed, acceleration, yaw rate, heading, steering angle, etc.) as well as the processing results of in-vehicle sub-systems (e.g., positioning, camera, radar, LiDAR system). This includes detected objects, their type and their relative distances to the ego-vehicle, as well as detection confidence data.

This recorded sensor data is continuously assessed with respect to its validity. Further, recorded data is used to predict future validity values per sensor data type depending on pre-defined/configured prediction time horizons.

Thus, besides current sensor-specific validity values, a vehicle also transmits predicted sensor-specific validity values and corresponding validity times. Such validity value and validity time estimates are particularly important for coordination of maneuvers that require a longer planning horizon.

For time series prediction, a variant of an algorithm or (exponential) moving average filtering is employed. Therefore, a "history" of previous sensor measurements and validity values is used. There is a trade-off when setting the history length and the prediction time window length, which should be taken into consideration.

Further, depending on the driving function different error metrics are relevant and are transmitted together with the validity value and the predicted validity time: Mean Absolute Percentage Error (MAPE), Mean Absolute Error (MAE), and Root Mean Squared Error (RMSE). Error models and metrics may be pre-configured for each vehicle. Further, each vehicle can change the transmitted error model details depending on driving situation. For example, for cooperated driving use cases (e.g., triggered by a MCM), a higher level of detail and thus more meta-data will be provided in addition to the validity values and validity predictions.

Before transmission of V2X messages, each (V2X-enabled) vehicle quantifies the quality of its in-vehicle sensor data using the validity-based failure algebra approach. Further, a vehicle may also predict sensor-specific validity values and corresponding validity times. It can be configured whether the predicted validity times are provided as relative time offsets or absolute time values (e.g., GNSS timestamp).

In case a single sensor-specific validity value is not deemed appropriate by a receiving vehicle and its in-built driving function/application, the receiving driving function/application may indicate the need for more detailed sensor-specific data in a sensor data request message ("request for extended sensor meta-data", "request for extended error model meta-data"). That request can also be issued by adding it as part of another regular message like the CAM or even implicitly by including the requested data in its own messages. Alternatively, the transmitting vehicle can be configured to provide extended sensor meta-data as part of its default V2X message content.

In case no cooperation request is received, or no other vehicles are in the ego-vehicle's vicinity, the vehicle can decide to stop transmitting sensor meta-data (as well as extended sensor meta-data or extended error model meta-data).

Upon reception of the "request for extended sensor meta-data", the transmitting (ego-) vehicle provides additional sensor-specific data, such as the m-dimensional failure vector, the significances of the m failure types, the system as well as the validity vector.

Using the received extended sensor meta-data, the receiving driving function monitors and assesses the provided data regarding the severity of sensor failures in relation to its safety requirements. Furthermore, the receiving driving function adapts its behavior during runtime while maintaining system safety.

Further embodiments and advantages will be apparent from the description of the enclosed figures, wherein.

Figure 1:
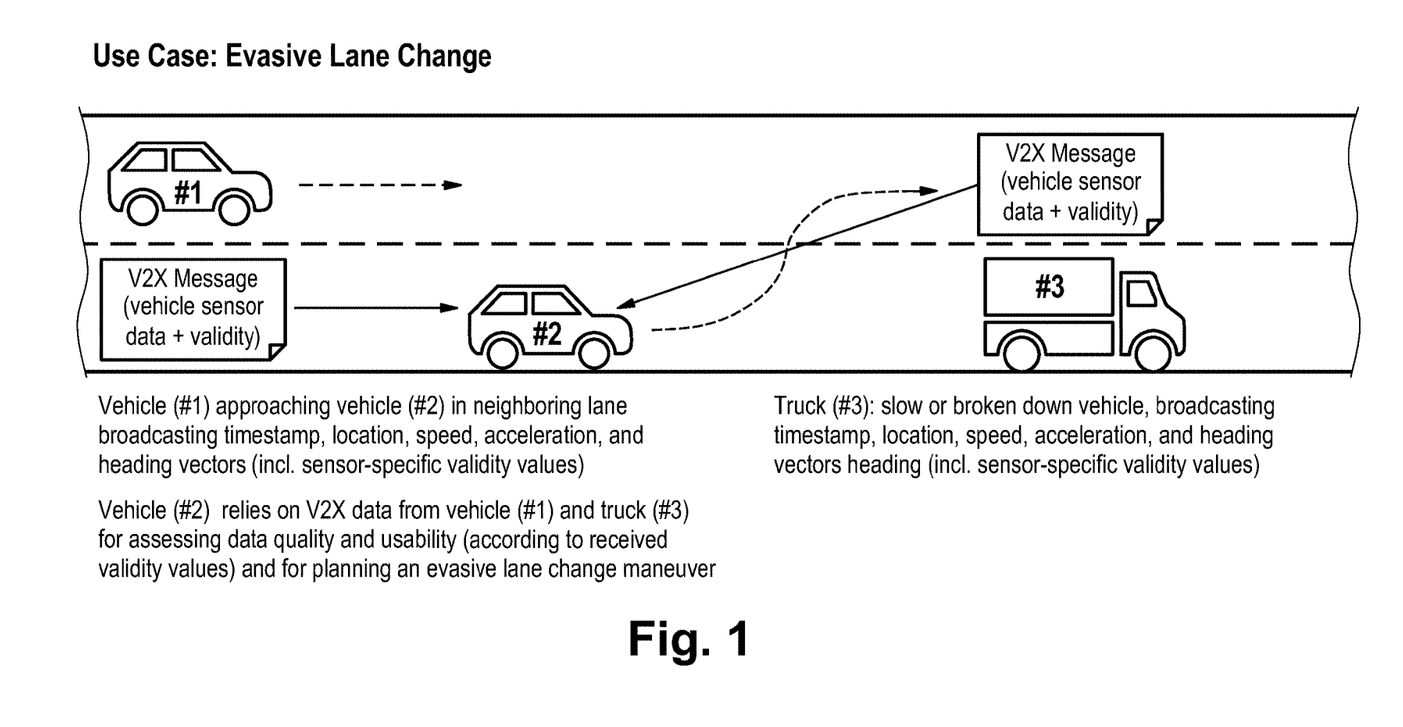
FIG. 1 shows a situation with three cars.

One exemplary use case, where sensor-specific meta-data and its validity are used, is shown in FIG. 1. The figure shows a first vehicle #1 driving on a left lane, a second vehicle #2 driving on a right lane, and a broken truck #3 standing on the right lane.

In the example, vehicle (#2) needs to determine whether the provided V2X sensor data from vehicle (#1) and truck (#3) fulfill its data requirements regarding data validity and usability. Based on this assessment, the vehicle (#2) may decide for a more conservative, i.e., a safer maneuver, such as reducing speed and in-lane stopping due to slow or broken-down truck, in case the provided data does not meet the driving function's requirements. If the driving function considers the provided data quality as sufficient and usable, it will plan and trigger an evasive lane change maneuver taking the provided sensor data and meta-data into account.

A minimal set of relevant sensor data for assessing whether an evasive lane change can be performed in a safe manner are vehicle speed and acceleration (in longitudinal direction), heading, location (longitude, latitude) of both vehicle (#1) and truck (#3).

As vehicle (#2) will use "safety margins" or minimum safety distances between itself and vehicle (#1) and truck (#3), respectively, the provided sensor data quality (e.g., accuracy and validity) may not result in distances to vehicle (#1) and truck (#3) that are smaller than the minimum safety distances when planning and performing the corresponding lane change maneuver. These minimum safety distances are assumed to be pre-configured by the driving function designer.

In particular, vehicle #2 may rely on vehicle #1 to continuously provide updated validity values and updates of the predicted validity as well as the predicted validity time period. Vehicle #2 uses this data in its planning process to assess whether the provided information will be available and received with the required quality and validity before and during maneuver execution.

For example, modeling static as well as dynamic error contributions and outliers, which are changing over time, are used to adjust filtering techniques and perform plausibility checks prior to application in control algorithms or driving behavior.

In case of cooperative driving scenarios (e.g., lane merging), the vehicle may use a method for coordinating a corresponding driving maneuver. For cooperative driving functions, the vehicle may be configured to provide "extended sensor meta-data".

Alternatively, such "extended sensor meta-data" may also be requested by vehicles in vicinity for performing cooperative driving maneuvers.

A cooperation request or any kind of vehicle-to-x-message may include, for example, besides the already defined parameters:
Vehicle position
Vehicle speed
Vehicle acceleration
Vehicle steering angle
Planned route
Distance to start of driving maneuver
At least one correction factor (based on learned driving behavior)
At least part of a future driving trajectory
Additional data may be included per sensor type:
Vehicle sensor-specific data validity and validity time
Predicted sensor-specific data validity for pre-configured time horizon
the m-dimensional failure vector, the significances of the m failure types, the system as well as the validity vector per sensor data type.

Figure 2:
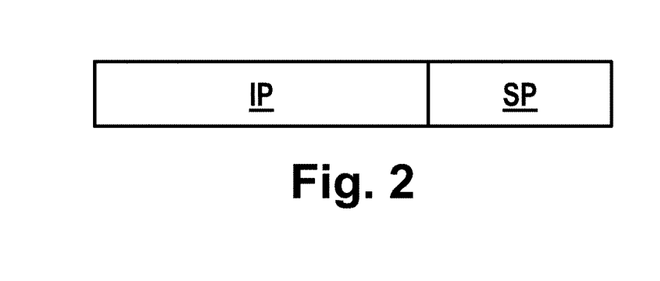
FIG. 2 shows a vehicle-to-x-message.

FIG. 2 shows a vehicle-to-x-message in an exemplary implementation. It may, for example, be sent by a vehicle or by an infrastructure unit and may be received by a vehicle or by an infrastructure unit. It comprises an information part IP and a safety part SP. The information part IP comprises standard information like position or heading of a vehicle and may also include respective tolerance bands. The safety part SP comprises information that allows a receiver to determine the safety of the information, e.g. information relating to a hardware or software development process or relating to a bit failure rate of a bus system.

In the following, the text of the priority application is inserted. This text is part of the disclosure of this application. It is not to be regarded as limiting the intended scope of protection, as long as its features are not incorporated in a claim. The features and implementations described in this text may be used separately, in combination with each other, and in combination with other features or implementations described previously in this application.

[Title]

Methods in particular for supporting of the fulfillment of functional safety requirements in V2X communication and Electronic Control Devices

TECHNICAL FIELD

The disclosure relates to methods in particular for supporting of the fulfillment of functional safety requirements in V2X communication, corresponding electronic control devices for a transmitting vehicle and a receiving vehicle.

BACKGROUND

This section provides background information related to the present disclosure which is not necessarily prior art.

ETSI standards [ETSI EN 302 637-2], [ETSI EN 302 637-3], [ETSI TS 102 894-2] and [ETSI EN 302 890-2] define data quality representations for the contents of V2X messages.

For dynamic states, confidence areas, in particular for 2D position, and confidence intervals, in particular for scalar signals, with a confidence level of 95% are used.

Mandatory content of a vehicle Cooperative Awareness Message (CAM) according to [ETSI EN 302 637-2]:

```
BasicContainer ::= SEQUENCE {
    stationType StationType,
    referencePosition ReferencePosition }
BasicVehicleContainerHighFrequency ::= SEQUENCE {
    heading Heading,
    speed Speed,
    driveDirection DriveDirection,
    vehicleLength VehicleLength,
    vehicleWidth VehicleWidth,
    longitudinalAcceleration LongitudinalAcceleration,
    curvature Curvature,
    curvatureCalculationMode CurvatureCalculationMode,
    yawRate YawRate }
```

One optional field in the BasicVehicleContainerHighFrequency is performanceClass PerformanceClass.

Detailed representation including confidence information according to [ETSI TS 102 894-2]:

```
ReferencePosition ::= SEQUENCE {
    latitude Latitude,
    longitude Longitude,
    positionConfidenceEllipse PosConfidenceEllipse,
    altitude Altitude }
PosConfidenceEllipse ::= SEQUENCE {
    semiMajorConfidence SemiAxisLength,
    semiMinorConfidence SemiAxisLength,
    semiMajorOrientation HeadingValue }
Altitude ::= SEQUENCE {
    altitudeValue AltitudeValue,
    altitudeConfidence AltitudeConfidence }
Heading ::= SEQUENCE {
    headingValue HeadingValue,
    headingConfidence HeadingConfidence }
Speed ::= SEQUENCE {
    speedValue SpeedValue,
    speedConfidence SpeedConfidence }
LongitudinalAcceleration ::= SEQUENCE {
    longitudinalAccelerationValue LongitudinalAccelerationValue,
    longitudinalAccelerationConfidence AccelerationConfidence }
Curvature ::= SEQUENCE {
    curvatureValue CurvatureValue,
    curvatureConfidence CurvatureConfidence }
YawRate::= SEQUENCE {
    yawRateValue YawRateValue,
    yawRateConfidence YawRateConfidence }
PerformanceClass ::= INTEGER {unknown(0), performanceClassA(1),
performanceClassB(2)} (0..7)
```

The Basic Safety Profile (BSP) of the Car2Car Communication Consortium (C2C-CC) defines the interpretation of the data quality values in detail for position, heading and speed. PerformanceClass is not used. The confidence level is defined as follows:

Definition RS_BSP_429

Information provided with a 'confidence level' of 95% means that the true value is inside the confidence interval or the confidence area for at least 95% of the data points in a given statistical population.

[ETSI TR 103 460] describes plausibility checks for data in V2X messages.

The DataQuality identifier of the Cooperative Perception Message (CPM) of the Car2Car Communication Consortium (C2C-CC) defines an algorithm to determine an "ObjectConfidence".

T. Brade, S. Zug and J. Kaiser, "Validity-Based Failure Algebra for Distributed Sensor Systems," 2013 IEEE 32nd International Symposium on Reliable Distributed Systems, Braga, 2013, pp. 143-152, doi: 10.1109/SRDS.2013.23 relates to a Validity-Based Failure Algebra, or in short, the Validity Concept, which introduces a validity-based quality measure of sensor observations applicable at design-time as well as at run-time.

Further, the concept was used for vehicle speed control depending on sensor data quality in Casimiro, A., Kaiser, J., Schiller, E. M., Costa, P., Parizi, J., Johansson, R., Librino, R.: The karyon project: predictable and safe coordination in cooperative vehicular systems. In: 2013 43rd Annual IEEE/IFIP Conference on Dependable Systems and Networks Workshop (DSN-W), pp. 1-12. IEEE (2013).

Brade, T., Jaeger, G., Zug, S., Kaiser, J., Sensor- and environment dependent performance adaptation for maintaining safety requirements, (2014) Lecture Notes in Computer Science (including subseries Lecture Notes in Artificial Intelligence and Lecture Notes in Bioinformatics), 8696 LNCS, pp. 46-54, refers to an example of a car autonomously driving a simple course and adapting its speed according to the environment and the confidence in the perceived sensor data. A set of simple safety rules is derived and used to adjust performance that affects the cruising speed.

Hoebel, J., Jaeger, G., Zug, S., Wendemuth, A., Towards a sensor failure-dependent performance adaptation using the validity concept, (2017) Lecture Notes in Computer Science (including subseries Lecture Notes in Artificial Intelligence and Lecture Notes in Bioinformatics), 10488 LNCS, pp. 270-286 applied the Validity Concept to 3D point clouds provided by camera-based sensor systems for object detection and pose estimation tasks.

The introduction of V2X systems raises questions regarding the usage of V2X data for example for automated driving functions that are subject to functional safety requirements. As of today, there is no concept that can ensure that V2X data transmitted and received by connected and (semi-)automated vehicles meet the respective safety requirements for connected, automated, and/or potentially cooperative driving functions. From a safety design standpoint, data that is transmitted by V2X communication is typically classified as "QM only", since its trustworthiness, correctness, accuracy and/or reliability cannot be validated.

There is no technical or legal mechanism in place to demand e.g. an implementation of minimal available accuracy information via confidence values.

SUMMARY

Implementations of the disclosure may include one or more of the following optional features.

For establishing trust among V2X stakeholders in using V2X data in particular for automated vehicle behavior and coordinating cooperative driving maneuvers according to an aspect of the disclosure safety-related data are transmitted from a sending vehicle. The proposed solution is not limited to a particular V2X use case but may be considered as a general enabler supporting the fulfillment of safety requirements of automated driving functions as well as for facilitating trustworthy data exchange.

According to an aspect of the disclosure a method may be executed at the receiver side utilizing the received safety-related data. The safety-related data may be used by a receiving vehicle for validating the received data and evaluating its usability for safety-related driving functions. Typical basic safety requirements are that the transmitted/received data shall be correct and reliable. Thus, the transmitting and receiving vehicles need to manage and process the to be exchanged vehicle sensor data and its usage at the receiver side for safety-related driving functions.

For considering, validating and finally relying on external data provided via V2X communication in the driving function design process, in particular the safety concept, as well as in the operational phase, according to an aspect of the disclosures methods in particular for supporting of the fulfillment of functional safety requirements in V2X communication executed by an electronic control device of a sending vehicle and an electronic control device of a receiving vehicle are provided on the data provider side as well as on the data receiver side.

According to an embodiment form of the present invention the safety-related data is comprised by safety-related data fields of V2X message, such as ETSI CAM, DENM.

According to an embodiment form of the present invention the safety-related data include sensor meta-data provided by at least one vehicle sensor.

According to an embodiment form of the present invention the vehicle sensor data is provided by in-vehicle components, e.g. as a measurement of a physical quantity, e.g. speed, heading, yaw rate, or as a processing result of an in-vehicle sub-system, e.g. positioning, camera, radar, LiDAR system. As the grade of the in-vehicle components and sub-system is known at vehicle level, the retrieved data can be assessed and rated, e.g. by using the respective component and sub-system specifications, validation test results, etc. Further, data-specific error models can be established and categorized.

According to an embodiment form of the present invention the transmitting vehicle adds specific sensor meta-data to the V2X message content, in particular when transmitting safety-related V2X messages. In particular for supporting automated and cooperative driving functions the transmitting vehicle provides sensor- and data-specific meta-data, e.g. confidence, variance, details of the underlying error model and/or absolute/relative validity time in addition to the standard vehicle sensor data fields to other V2X-enabled vehicles. Sensor-specific meta-data, such as confidence, depends on the current sensor state, e.g. start-up, operational, failure, and may change over time.

According to an embodiment form of the present invention a standardized catalogue of agreed error models is used. Herewith, an optimized data volume needed for V2X data exchange and usefulness for different receivers can be achieved, where each receiver and the related assistance or driving function must meet different requirements regarding the data availability and observability.

According to an embodiment form of the present invention the sensor data and sensor meta-data validity are determined by the transmitting vehicle.

According to an embodiment form of the present invention the data type and the meta-data's level of detail are determined by the transmitting vehicle and can differ with respect to the use case and driving situation. A receiving vehicle can use the provided sensor data and sensor meta-data to check whether this data is qualified to be used by an automated and/or cooperative driving function.

According to an embodiment form of the present invention a "Validity-Based Failure Algebra" approach (validity-based quality measure of sensor observations applicable at design-time as well as at run-time) in particular according to T. Brade, S. Zug and J. Kaiser, "Validity-Based Failure Algebra for Distributed Sensor Systems," 2013 IEEE 32nd International Symposium on Reliable Distributed Systems, Braga, 2013, pp. 143-152, doi: 10.1109/SRDS.2013.23 is utilized for the validation of received V2X data and sensor meta-data.

According to an embodiment form of the present invention the transmitting vehicle does not only provide information on instantaneous sensor data validity, but continuously monitors and aggregates in-vehicle sensor data for predicting future sensor validity and the related validity time, i.e. a future validity value plus a time period for how long the predicted validity value is estimated to be valid may be provided by the transmitting vehicle. In particular, sensor-specific validity values plus extended senor meta data including the various error contributions (depending on the underlying error models) may be determined and transmitted.

According to an embodiment form of the present invention the transmission of detailed and extended sensor meta-data can be pre-configured or requested via V2X messaging.

According to an embodiment form of the present invention the sensor quality-related meta-data can be used to extend a solution for cooperative driving, where cooperation requests are only accepted, if additional safety related meta-data, e.g. sensor validity values, can be provided by the requesting vehicle.

The proposed solution enables connected and (semi-) automated vehicles to assess whether information provided from external sources, e.g. backend systems, roadside units and/or other V2X enabled entities, can be used for safety-related vehicle functions, such as advanced driver assistance systems, e.g. automated emergency braking and/or automated driving functions. Enable the design and operation of connected, automated and/or cooperative vehicle driving functions. The Safety design process and requirements require the ability to identify and trace faults/faulty behavior (SOTIF) of automated driving functions.

According to an embodiment form of the present invention sensor meta-data, i.e. sensor validity/quality values, are transmitted and in particular a cooperation request by another vehicle may only be accepted, if such meta-data can be provided by the requesting vehicle.

Thus, according to an embodiment form of the present invention a cooperation request comprises:
Vehicle position;
Vehicle speed;
Vehicle acceleration;
Vehicle steering angle;
Planned route;
Distance to start of driving maneuver;
At least one correction factor (based on learned driving behavior);
At least part of a future driving trajectory; and/or
Additional data per sensor type:
   Vehicle sensor-specific data validity and validity time
   Predicted sensor-specific data validity for pre-configured time horizon; and/or
   m-dimensional failure vector, the significances of the m failure types, the system as well as the validity vector per sensor data type.

DETAILED DESCRIPTION

According to an embodiment form of the present invention a sending vehicle collects its in-vehicle sensor data, e.g. time, location (longitude, latitude, altitude), (wheel) speed, acceleration, yaw rate, heading, steering angle, etc.

According to an embodiment form of the present invention defined failure, detector and/or filter models are utilized to determine sensor-specific validity values. During operation, a vehicle continuously or periodically monitors and updates its sensor-specific validity values.

According to an embodiment form of the present invention the vehicle monitors and aggregates its in-vehicle sensor data (time, location (longitude, latitude, altitude), (wheel) speed, acceleration, yaw rate, heading, steering angle, etc.) as well as the processing results of in-vehicle sub-systems (e.g., positioning, camera, radar, LiDAR system). This may include detected objects, their type and/or their relative distances to the ego-vehicle, as well as detection confidence data.

According to an embodiment form of the present invention sensor data is continuously assessed with respect to its validity.

According to an embodiment form of the present invention recorded data is used to predict future validity values per sensor data type depending on pre-defined/configured prediction time horizons and transmits the predicted sensor-specific validity values and corresponding validity times. Thus, besides current sensor-specific validity values, a vehicle also transmits predicted sensor-specific validity values and corresponding validity times. Such validity value and validity time estimates are particularly important for coordination maneuvers that require a longer planning horizon.

According to an embodiment form of the present invention for time series prediction, a variant of a Holt-Winters method or (exponential) moving average filtering is employed. Therefore, a history of previous sensor measurements and validity values may be used. There is a trade-off when setting the history length and the prediction time window length, which can be taken into consideration.

According to an embodiment form of the present invention depending on the driving function different error metrics are transmitted together with the validity value and the predicted validity time: Mean Absolute Percentage Error (MAPE), Mean Absolute Error (MAE) and/or Root Mean Squared Error (RMSE). Error models and metrics can be pre-configured for each vehicle.

According to an embodiment form of the present invention the vehicle can change the transmitted error model details depending on the driving situation. For example, for cooperated driving use cases, e.g. triggered by a Maneuver Coordination Message (MCM), a higher level of detail and thus more meta-data will be provided in addition to the validity values and validity predictions.

According to an embodiment form of the present invention a (V2X-enabled) vehicle quantifies the quality of its in-vehicle sensor data using the validity-based failure algebra approach before transmission of V2X messages.

According to an embodiment form of the present invention a vehicle predicts sensor-specific validity values and corresponding validity times. It can be configured whether the predicted validity times are provided as relative time offsets or absolute time values, e.g. GNSS timestamps.

In case a single sensor-specific validity value is not deemed appropriate by a receiving vehicle and its in-built driving function/application, the receiving driving function/application according to an embodiment form of the present invention indicates the need for more detailed sensor-specific data in a sensor data request message ("request for extended sensor meta-data", "request for extended error model meta-data"). That request can also be issued by adding it as part of another regular message like the CAM or even implicitly by including the requested data in its own messages. Additionally or alternatively, the transmitting vehicle can be configured to provide extended sensor meta-data as part of its default V2X message content.

In case no cooperation request is received or no other vehicles are in the (ego-)vehicle's vicinity, according to an embodiment form of the present invention, transmitting of sensor meta-data and/or extended sensor meta-data and/or extended error model meta-data can be stopped.

According to an embodiment form of the present invention the transmitting (ego-)vehicle provides additional sensor-specific data, such as the m-dimensional failure vector, the significances of the m failure types, the system and/or the validity vector upon reception of a request for extended sensor meta-data.

Using the received extended sensor meta-data, the receiving driving function may monitor and assess the provided data regarding the severity of sensor failures in relation to its safety requirements. Furthermore, the receiving driving function may adapt its behavior during runtime while maintaining system safety.

One exemplary use case, where sensor-specific meta-data and its validity is used, is explained based on the schematically shown exemplary traffic situation in FIG. 1.

In the traffic situation according to FIG. 1 a vehicle #2 needs to determine whether the provided V2X sensor data from a vehicle #1 and truck #3 fulfill its data requirements regarding data validity and usability. Based on this assessment, the vehicle #2 decides for a more conservative, i.e. a safer maneuver, such as reducing speed and in-lane stopping due to slow or broken-down truck, in case the provided data does not meet the driving function's requirements. If the driving function considers the provided data quality as sufficient and usable, it will plan and trigger an evasive lane change maneuver taking the provided sensor data and meta-data into account.

A minimal set of relevant sensor data for assessing whether an evasive lane change can be performed in a safe manner are vehicle speed and acceleration (in longitudinal direction), heading, location (longitude, latitude) of both vehicle #1 and truck #3.

As vehicle #2 will use "safety margins" or minimum safety distances between itself and vehicle #1 and truck #3, respectively, the provided sensor data quality (e.g., accuracy and validity) may not result in distances to vehicle #1 and truck #3 that are smaller than the minimum safety distances when planning and performing the corresponding lane change maneuver. These minimum safety distances are assumed to be pre-configured by the driving function designer.

In particular, vehicle #2 relies on vehicle #1 to continuously provide updated validity values and updates of the predicted validity as well as the predicted validity time period. Vehicle #2 uses this data in its planning process to assess whether the provided information will be available and received with the required quality and validity before and during maneuver execution.

For example, modeling static as well as dynamic error contributions and outliers, which are changing over time, are used to adjust filtering techniques and perform plausibility checks prior to application in control algorithms or driving behavior.

In case of cooperative driving scenarios (e.g., lane merging), the vehicle may use a method for coordinating a corresponding driving maneuver. For cooperative driving functions, the vehicle is configured to provide extended sensor meta-data. Alternatively, the extended sensor meta-data may also be requested by a vehicle in vicinity for performing cooperative driving maneuvers.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/ or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

If in the course of the proceedings it transpires that a feature or a group of features is not absolutely necessary, then the applicant here and now seeks a wording of at least one independent claim, no longer comprising the feature or the group of features. This may, by way of example, involve a sub-combination of a claim existing as at the application date or a sub-combination of a claim existing as at the application date restricted by further features. Such claims or combinations of features, which are to be newly worded, are understood to also be covered by the disclosure of this application.

It is further pointed out that configurations, features and variants of aspects of the invention, which are described in the various embodiments or embodiment examples and/or shown in the figures, can be combined with one another as desired. Individual or multiple features are interchangeable as desired. Resulting combinations of features are understood to also be covered by the disclosure of this application.

Back references in dependent claims should not be construed as a waiver of the right to independent, objective protection for the features of the subclaims referred back to. These features can also be used in any combination with other features.

Features which are only disclosed in the description or features which are disclosed in the description or a claim only in conjunction with other features can, in principle, be of independent inventive relevance. They can therefore also be included separately in claims to distinguish from the prior art.

It should be pointed out in general that vehicle-to-X communication means, in particular, a direct communication between vehicles and/or between vehicles and infrastructure facilities and/or road users in general. By way of example, therefore, vehicle-to-vehicle communication or vehicle-to-infrastructure communication may be involved. Where communication between vehicles is referred to within the framework of this application, this can essentially, by way of example, take place within the framework of vehicle-to-vehicle communication, which typically takes place without the intermediary of a mobile network or a similar external infrastructure and which can therefore be distinguished from other solutions which, by way of example, are based on a mobile network. By way of example, vehicle-to-X communication can take place using the standards IEEE 802.11p or IEEE 1609.4. Vehicle-to-X communication can also be referred to as C2X communication. The sub-areas can be referred to as C2C (Car-to-Car) or C2I (Car-to-Infrastructure). The aspects of the invention expressly do not, however, exclude vehicle-to-X communication with the intermediary of, for example, a mobile network.

A number of implementations have been described. Nevertheless, it will be understood that various modifications may be made without departing from the spirit and scope of the disclosure. Accordingly, other implementations are within the scope of the following claims.

Features of the claims of the priority application:
1. Method in particular for supporting of the fulfillment of functional safety requirements in V2X communication executed by an electronic control device of a sending vehicle, comprising the steps:
   transmitting, by a wireless communication device, safety-related data.
2. Method in particular for supporting of the fulfillment of functional safety requirements in V2X communication executed by an electronic control device of a receiving vehicle, comprising the steps:
   receiving, by a wireless communication device, safety-related data.
3. Method according to at least on of claim 1 or 2, wherein the safety-related data include sensor meta-data provided by at least one vehicle sensor.
4. Method according to at least on of claims 1 to 3, wherein the safety-related data is comprised by safety-related data fields of a V2X message.
5. Method according to at least on of claims 1 to 4, wherein a standardized catalogue of agreed error models is utilized.
6. Method according to at least on of claims 1 to 5, wherein the received safety-related data are validated and/or evaluated regarding its usability for safety-related driving functions by a receiving vehicle.
7. Method according to at least on of claims 1 to 6, wherein a Validity-Based Failure Algebra method is utilized for the validation of the received sensor meta-data.

8. Method according to at least on of claims 1 to 7, wherein the transmitting vehicle continuously monitors and aggregates in-vehicle sensor data for predicting future sensor validity and the related validity time.

9. Method according to at least on of claims 1 to 8, wherein the transmission of sensor meta-data can be pre-configured or requested via V2X messaging.

10. An electronic control device supported by a sending vehicle, the electronic control device comprising:
a wireless communication device configured to transmit safety-related data.

11. An electronic control device supported by a sending vehicle according to claim 10, wherein the electronic control device is configured to execute a method related to the sending vehicle according to at least on of claims 1 to 10.

12. An electronic control device supported by a receiving vehicle, the electronic control device comprising:
a wireless communication device configured to receive safety-related data.

13. An electronic control device supported by a sending vehicle according to claim 12, wherein the electronic control device is configured to execute a method related to the receiving vehicle according to at least on of claims 1 to 10.

The invention claimed is:

1. Method for sending a vehicle-to-x-message by a sender, wherein the vehicle-to-x-message comprises:
an information part, and
a safety part,
wherein the information part comprises information characterizing the sender and/or data measured and/or calculated by the sender, and
wherein the safety part comprises safety information relating to resistance against technical failures that have not been initiated deliberately of one or more entities of the sender measuring, calculating, transmitting and/or processing the information.

2. The method according to claim 1,
wherein the safety part comprises at least one safety level characterizing an entity and/or a provided information grade.

3. The method according to claim 1,
wherein the safety part comprises at least one failure rate of a bus system transmitting the information before sending.

4. The method according to claim 1,
wherein the safety part comprises at least one indication of a software development process, hardware development process, data generation process, safety engineering standard or processing grade used for developing software of an entity.

5. The method according to claim 1,
wherein the safety part comprises a respective predicted validity time for one, some or all information.

6. The method according to claim 5,
wherein the validity time is, at least inter alia, calculated based on previous measurements or calculations and/or previous validity values.

7. The method according to claim 1,
wherein the safety part comprises at least one indication of an error model of an entity.

8. The method according to claim 1,
wherein the safety part comprises at least one confidence, variance, details of an underlying error model of an entity, and/or an absolute or relative validity time of data generated by an entity.

9. The method according to claim 1,
wherein the safety part comprises meta-data and/or a multidimensional failure vector.

10. The method according to claim 1,
wherein the safety information is continuously updated.

11. The method according to claim 1,
wherein the information part comprises one or more of sensor data, speed sensor data, heading data, yaw rate data, acceleration data, curvature data, path history data, radar data, lidar data, steering angle data, position data, camera data, map data, object data, maneuver-related data, intended or planned driving trajectory and/or course data.

12. The method according to claim 1,
wherein also vehicle-to-x-messages without a safety part are sent, and
wherein vehicle-to-x-messages including a safety part are only or at least sent in response to one or more pre-defined events and/or automated driving policy or function and/or detected entities near the sender and/or in response to a received request.

13. The method according to claim 1,
wherein the information part comprises tolerance bands for one, some or all information.

14. Method for processing a vehicle-to-x-message, the method comprising:
receiving a vehicle-to-x-message comprising an information part and a safety part, wherein the safety part comprises safety information relating to resistance against technical failures that have not been initiated deliberately,
identifying a task and/or function in which the vehicle-to-x-message is relevant,
assessing, based on the safety part and/or the information part, whether information quality or data quality of the vehicle-to-x-message is sufficient for the task, and
performing the task based at least on the vehicle-to-x-message only if the information quality and/or data quality is sufficient.

15. The method according to claim 14,
further comprising:
sending a request for further safety data if the data quality and/or safety cannot be determined sufficiently based on the safety data and/or the information.

16. The method according to claim 14,
wherein the task is at least one of a lane change, reducing speed and in-lane stopping.

17. Vehicle-to-x-communications module configured to perform the method according to claim 1.

18. Vehicle-to-x-communications module configured to perform the method according to claim 14.

19. The method according to claim 15,
wherein the task is at least one of a lane change, reducing speed and in-lane stopping.

20. Method for sending a vehicle-to-x message by a sender, wherein the vehicle-to-x message comprises:
an information part, and
a safety part,
wherein the information part comprises information characterizing the sender and/or data measured and/or calculated by the sender, and
wherein the safety part comprises safety information relating to one or more entities of the sender measuring, calculating, transmitting and/or processing the information, wherein the safety part comprises at least one safety level characterizing an entity and/or a provided information grade;

wherein the safety part comprises at least one failure rate of a bus system transmitting the information before sending;

wherein the safety part comprises at least one indication of a software development process, hardware development process, data generation process, safety engineering standard or processing grade used for developing software of an entity;

wherein the safety part comprises a respective predicted validity time for one, some or all information;

wherein the validity time is, at least inter alia, calculated based on previous measurements or calculations and/or previous validity values;

wherein the safety part comprises at least one indication of an error model of an entity;

wherein the safety part comprises at least one confidence, variance, details of an underlying error model of an entity, and/or an absolute or relative validity time of data generated by an entity;

wherein the safety part comprises meta-data and/or a multidimensional failure vector;

wherein the safety information is continuously updated;

wherein the information part comprises one or more of sensor data, speed sensor data, heading data, yaw rate data, acceleration data, curvature data, path history data, radar data, lidar data, steering angle data, position data, camera data, map data, object data, maneuver-related data, intended or planned driving trajectory and/or course data;

wherein also vehicle-to-x-messages without a safety part are sent, and wherein vehicle-to-x-messages including a safety part are only or at least sent in response to one or more pre-defined events and/or automated driving policy or function and/or detected entities near the sender and/or in response to a received request; and wherein the information part comprises tolerance bands for one, some or all information.

* * * * *